March 21, 1961 G. A. MARSH ET AL 2,976,123
CORROSION-MEASURING APPARATUS
Filed March 24, 1958 3 Sheets-Sheet 1

INVENTORS
GLENN A. MARSH
BY EDWARD SCHASCHL
Edward H. Lang
ATTORNEY

March 21, 1961  G. A. MARSH ET AL  2,976,123
CORROSION-MEASURING APPARATUS

Filed March 24, 1958  3 Sheets-Sheet 2

INVENTORS
GLENN A. MARSH
BY  EDWARD SCHASCHL

Edward H. Lang
ATTORNEY

March 21, 1961 G. A. MARSH ET AL 2,976,123
CORROSION-MEASURING APPARATUS
Filed March 24, 1958 3 Sheets-Sheet 3

INVENTORS.
GLENN A. MARSH
BY EDWARD SCHASCHL

Edward H Fay
ATTORNEY

United States Patent Office 2,976,123
Patented Mar. 21, 1961

2,976,123

CORROSION-MEASURING APPARATUS

Glenn A. Marsh and Edward Schaschl, Crystal Lake, Ill., assignors to The Pure Oil Company, Chicago, Ill., a corporation of Ohio Filed Mar. 24, 1958, Ser. No. 723,503

11 Claims. (Cl. 23—253)

This invention relates broadly to a corrosion-measuring apparatus utilizing a corrodible sensing element, under stress or strain, which deforms or deflects in an amount proportional to the degree of corrosion. In one embodiment the sensing element is polymetallic and includes outer layers of the metal to be studied, formed as a unit with an inner layer of dissimilar metal of a different coefficient of linear thermal expansion. In a more particular embodiment, this invention relates to a corrosion-measuring apparatus wherein there is provided a corrodible sensing element made of a plurality of layers of a material of construction having different coefficients of linear thermal expansion in combination with indicating means whereby an exposed portion of the element is corroded, causing the entire element to bend or flex in an amount proportional to the degree of corrosion, the amount of bending being sensed by the indicating means.

Corrosion-test probes incorporating various means for detecting the degree and rate of corrosion of a corrosive atmosphere are known in the prior art and used for purposes of determining the relative resistance to corrosion of various materials of construction. In general, these devices take advantage of the methods that have been devised to make use of a correlation between change in electrical conductivity and change in cross-sectional area to determine the rate of corrosion of various materials of construction. Such devices are depended upon, in conjunction with electrical resistance-change meter circuits, to detect the change in electrical resistance of a corroding element with change in cross-sectional area.

The present invention is based upon the discovery that by providing a sensing element which is made up of outer layers of the material of construction under test and inner layers of a material of a different coefficient of thermal expansion as the core, wherein the plurality of layers are joined to form an element which is in equilibrium as far as influences of temperature are concerned upon its external shape, when one outer portion thereof is corroded, the sensing element tends to bend. Furthermore, the degree of bending has been found to be substantially proportional to the degree of corrosion of the corroded side. Thus, by providing indicating means in combination therewith, a direct-reading corrosion meter is made possible.

Accordingly, the primary object of this invention is to provide a direct-reading, corrosion-measuring apparatus.

Another object of this invention is to provide a direct-reading, corrosion-measuring apparatus employing a corrodible sensing element in combination with a stress or strain.

Another object of this invention is to provide a direct-reading, corrosion-measuring apparatus employing a multi-layer sensing element in which the material of construction under study comprises the outer layers of said element and one of said outer layers is exposed to the corroding atmosphere and the other is protected from the corroding atmosphere.

Still a further object of this invention is to provide a corrosion-testing apparatus having a sensing element which comprises three layers of metal strip bonded together, the outer layers of which are the metals of construction to be tested and the inner layer is a metal having a different coefficient of linear thermal expansion.

Another object of this invention is to provide a corrosion-sensing element which comprises an elongated, substantially rectangular element having outer layers of ferrous metal and inner layers of brass or solder, which element is sensitive to a corrosive atmosphere and exhibits a linear deformation proportion to the metal loss on an exposed side thereof.

These and other objects of the invention will become apparent as the description thereof proceeds.

The invention is best described in relation to the drawings in which.

Figure 3:
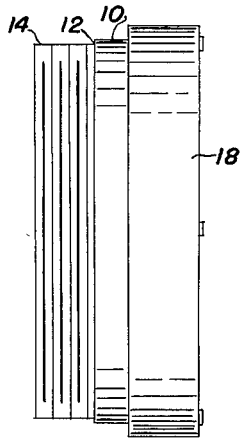
Figure 3 is a plane side view of the embodiments shown in Figure 1.

Referring to the drawings, in Figures 1, 2, 3 and 4, the apparatus is represented by tubular body member 10 having sealing shoulder 12 and threaded portion 14. Member 10 functions as a case for the apparatus and is adapted to be inserted or attached through the wall of a process vessel (not shown) by means of threads 14. Member 10 has a central chamber 16 which is open on one end and closed at the other end by cover member 18 forming a housing for sensing element 20.

Sensing element 20 is made up of three layers of material and one layer of a protective film. The outer exposed layer of material of sensing element 20 is indicated at 22. An inner layer of material having a different coefficient of linear thermal expansion is indicated at 24. The inner layer 24 is joined to a second layer of material 26 which has the same composition as layer 22. These respective layers of material of construction are bonded together by employing the inner layer as a solder or weld, or by the application of high pressures. Layer 26 is covered by a protective film, indicated at 28, which protects same from the corrosive atmosphere. Cover member 18 attaches to body member 10 by means of screws 30 which extend through transparent or glass window 32 and circular gasket 34 to form a pressure-tight seal. The layers of material of construction making up sensing element 20 are dimensioned so that their widths are about 10 times their thicknesses in order that any corrosion taking place on the edges thereof does not introduce any appreciable error.

Sensing element 20 is attached to base 36 by welded or solder joints 38, and the assembly is fastened to body-member 10 by means of screws 40 and 42. A pointed, needle-like indicator 44 is attached to the center, top back-side of sensing element 20. Needle 44 may be soldered or welded into position. Immediately behind the top of element 20 and needle 44 is located indicator scale 46, having graduations 48 on the face thereof. Scale 46 is held to the top inside surface of body member 10 by means of screws 50.

In operation, the device is screwed into an aperture within the wall of a process vessel containing the corrosive atmosphere. The chamber 16, being open at one end, becomes filled with the corrosive atmosphere and begins to attack element 20. Since protective layer 28 prevents contact between the corrosive atmosphere and layer 26, all corrosion takes place on the exposed portions of the element, particularly the flat surface of layer 22. Coating 28 may be extended over the edges of the element to prevent any corrosion on the side edges. As fabricated, element 20 is in equilibrium and the stresses and strains due to thermal expansion and contraction off-set each other. This equilibrium is established by having the outer layers of material 22 and 26 of substantially the same thickness, excluding the thickness of coating 28. Layer 24 may be of any thickness, that is equal to the thickness, less than, or greater than that of layers 22 and 26, depending on the sensitivity desired. As layer 22 corrodes, this equilibrium is upset and the degree of expansion or contraction, being proportional to thickness thereof, causes a gradual bending of element 20 as exemplified by the dotted lines 52 in Figure 1. Needle pointer 44 advances along scale 46 in proportion to the degree or amount of corrosion. The results are discernible through transparent cover 32. Illumination may be employed to better read the position needle pointer 44. Instead of placing scale 46 behind element 20, the scale may be on glass cover 32, provided steps are taken to avoid parallax. When the instrument is assembled, some leeway in positioning both scale 46 and base 36 by means of the screws is provided by using elongated apertures for the screws so that pointer 44 reads "zero" at the start of the measurement. If no adjustment is made, a record is kept of the position of pointer 44 on scale 46 before the instrument is contacted with the corrosive atmosphere. The time of contact may be recorded and the rate of corrosion followed in relation to time, if desired.

In order to demonstrate the invention, a three-layer metallic sandwich comprising two outer layers of 16 gauge steel held together by a 1/8" layer of silver solder was assembled. This element measured 13 cm. x 2.7 cm. x 0.6 cm. One side, comprising one layer of the steel was covered with a coating of epoxy resin, about 0.1 cm. in thickness. This element was suspended in a 2% aqueous solution of nitric acid at room temperature for 16 hours. At the end of this time, it was found that the element was bent uniformly toward the corroded side (or unprotected side) by an amount equal to 0.8 cm., or 5/16 inch deviation from the normal. In other words, the deviation was sufficient to move pointer 44 5/16 of an inch along scale 46.

The corrosion sensing element and its response to corrosion may be used in combination with several different means for detecting the amount of bending. Various mechanical, electrical, electronic, light-sensitive and other devices may be connected to the free end of the element to detect or show the amount of deviation from normal. Thus, the rather small deviation of the free end of the element may be magnified by the simple lever-like needle shown in Figures 5, 6, 7 and 8. In these figures the body member 10 having shoulder 12, and threaded portion 14, is similarly equipped with element 20. Cover member 60 in this instance is opaque and the body member has a walled port 62 extending from the top side thereof, with aperture 64 extending to within chamber 16. Port 62 has a threaded opening 66 terminating in bevel-shoulder 68. Compressible gasket 70 is held thereagainst by means of plug member 72. Element 20 has attached thereto a thin rod 74 which extends through aperture 64 in port 62 and also through gasket 70 and plug member 72. Rod 74 is welded or soldered to element 20 as indicated at 76. Rod 74 engages pin 78 attached through an aperture therethrough and is similarly attached to needle 80. Bracket 82 is attached to body member 10 by means of screw 84 to hold plate 86 bearing scale 88 at the curved top thereof. Pin 90 extends through needle 80 at a point below its mid-point and attaches to plate 86 to form a pinion for needle 80.

Figure 9:
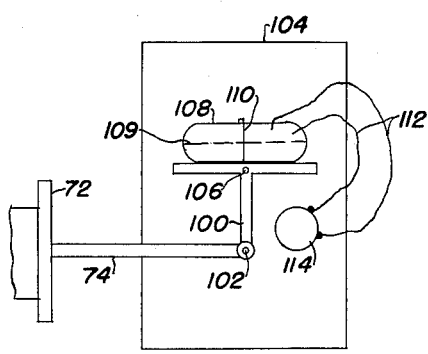
Figure 9 is a partial plane view showing the connection of the device to a mercury switch and an alarm.
Figure 10:
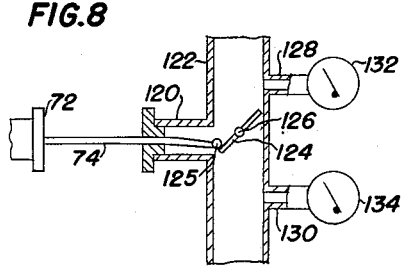
Figure 10 is another partial plane view showing the connection of the device to a valve within a conduit.

Other means for detecting the movement of element 20 are shown in Figures 9 and 10 wherein the body portion 10 and related parts have been omitted, and rod 74 and plug member 72 only are shown in relationship with a mercury switch and a pressure-control valve. The mechanical arrangement of Figure 9 is similar to that of Figures 5–8 in that rod 74 is pinioned to T-member 100 by means of pin 102. T-member 100 is pinioned to plate 104 by means of pin 106 so that movement of rod 74 tilts mercury switch 108 containing body of mercury 109 held to T-member 100 by means of clip 110. This action closes circuit 112 and actuates signal device 114 which may be a light or an alarm, connected to an electrical circuit not shown.

In Figure 10, rod 74, supported in sealed relationship by plug member 72, extends through a second sealing plug 120 connected to conduit 122. Valve 124 is pinioned on pin 126 within conduit 122 through which a gas or liquid is flowing. Valve 124 is connected to rod 74 by means of pinion 125 and is movable therewith. Branch conduits 128 and 130 connect to pressure gauges 132 and 134 respectively. Movement of rod 74 through corrosion of element 20 (not shown) causes valve 124 to close and the degree of movement is registered by the pressure differences on gauges 132 and 134.

Rod 74 could be made to move other apparatus by which the degree or rate of corrosion may be measured. Included are a rheostat in an electrical circuit as a Wheatstone bridge, an orifice valve, or a rheostat controlling a variable speed motor connected to an automatic recording needle operation on a moving chart.

Figure 11:
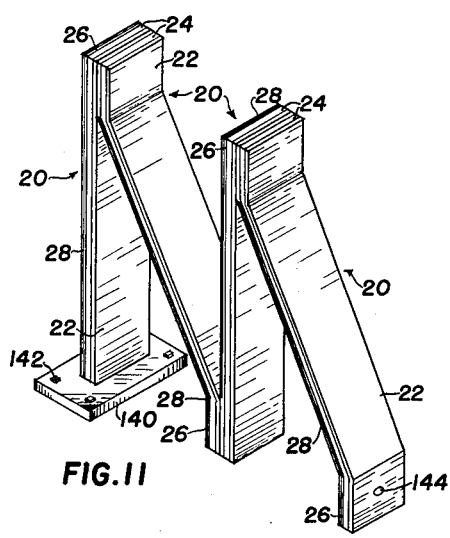
Figure 11 is an isometric side view of another form of corrodible element comprising a plurality of individual members fastened together at opposite ends.

Referring to Figure 11, base member 140, provided with bolt holes 142 for attachment within a suitable housing is shown supporting a plurality of test or sensing elements 20, each of which is made up of an exposed outer layer of corrodible material 22, an inner core layer 24 and the protected or coated layer 26. The protective coating is indicated by layer 28. In fabricating, the ends of the elements are welded, soldered, or pressure-bonded together and the first element in the series is similarly attached to base 140. Coating 28 does not extend between these points or areas of attachment. The ends of alternate elements are bent slightly to give an accordion arrangement and all of the exposed sides or layers 22 face in the same direction. Aperture 144 is provided for the attachment of an indicating needle as used in the embodiment shown in Figures 1, 2, 3 and 4, or for the attachment of arm 74 as shown in Figures 5, 6, 7 and 8, or in the combinatons shown in Figures 9 and 10. As an alternative, the exposed or corrodible layers 22 may be on the opposite sides of each sensing element from that shown in Figure 11, in which event the motion imparted to the terminal end of the last element (at aperture 144) will be in the opposite direction, that is, toward the base 140 instead of away from it as would be the function of the arrangement shown.

Figure 1:
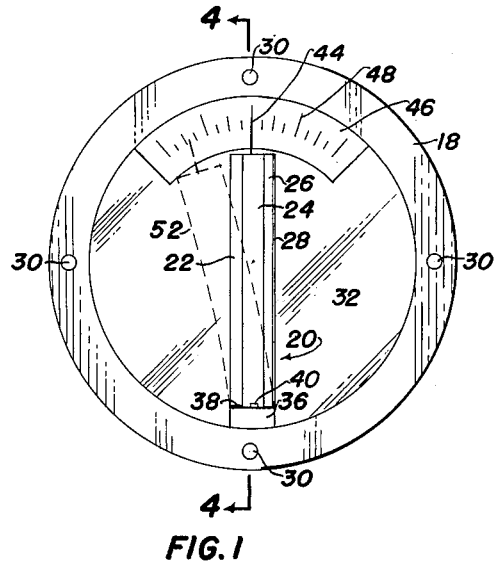
Figure 1 is a plane front view of one form of the apparatus.
Figure 4:
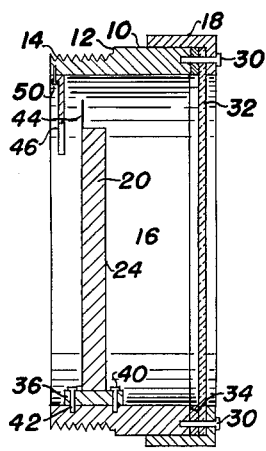
Figure 4 is a cross-sectional view taken along lines 4—4 in Figure 1 to show more of the details of construction.
Figure 2:
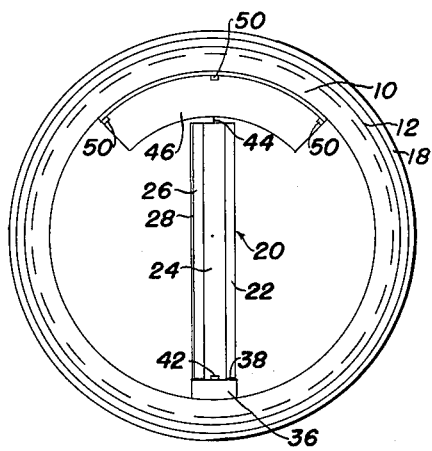
Figure 2 is a plane back view of the embodiments shown in Figure 1.
Figure 6:
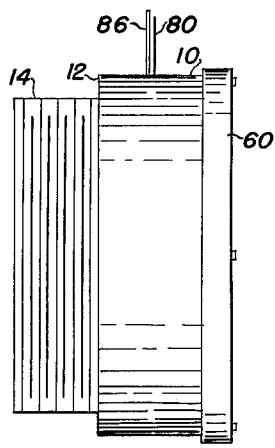
Figure 6 is a side view of the embodiments shown in Figure 5.
Figure 5:
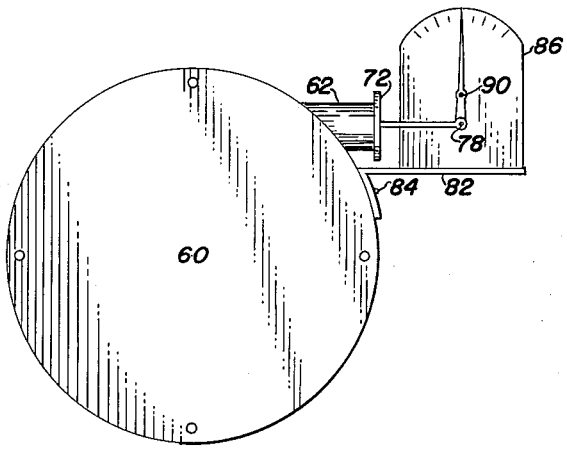
Figure 5 is a plane front view of another form of the apparatus showing a direct reading device and the linkage therefor.
Figure 7:
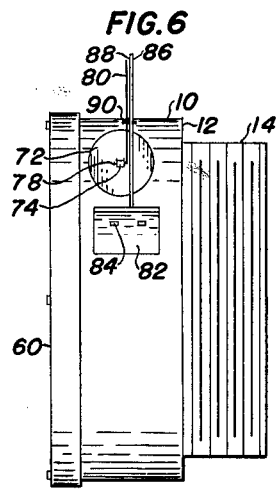
Figure 7 is another side view of the embodiments shown in Figure 5.
Figure 8:
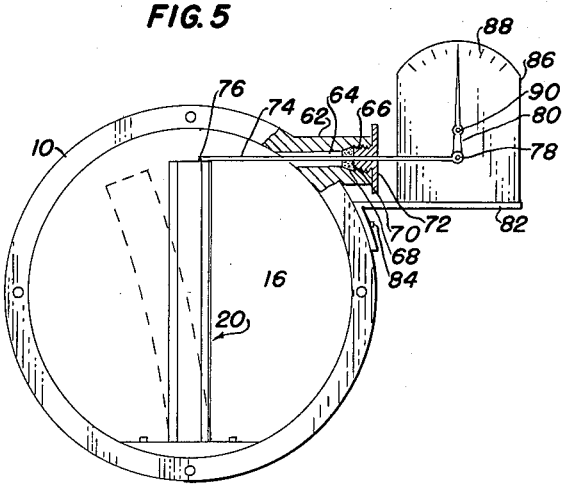
Figure 8 is a front partial sectional view of the embodiments shown in Figure 5 with the cover member thereof removed.
Figure 12:
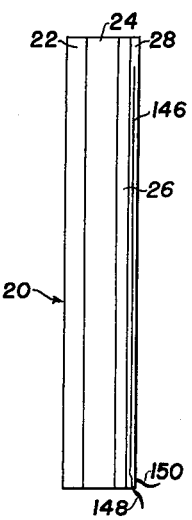
Figure 12 is a plane side view of another form of corrodible element incorporating a strain gauge within the plastic coating thereon.
Figure 13:
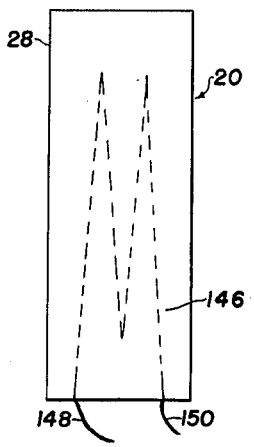
Figure 13 is a front view of the embodiment shown in Figure 12.

In Figures 12 and 13 another embodiment is shown wherein a sensing element 20, constructed as described in Figures 1, 2, and 4, but having a strain gauge 146 incorporated in the plastic coating 28, forms a sensitive corrosion measuring means. The purpose of strain gauge 146 is to sense any lineal changes or bending of element 20 due to corrosion of exposed layer 22. Leads 148 and 150 are connected to the ends of the strain gauge 146 for the purpose of connecting same to an electrical circuit to detect the unbalance or change in electrical resistance in strain gauge 146 due to bending of element 20. This arrangement can be incorporated in a housing such as shown in Figures 1–4 for the purpose of exposing the element 20 to the corrosive atmosphere. Other equivalent means of supporting and maintaining the element 20 with its associated strain gauge 146 in a corrosive atmosphere may be used. Thus, the arrangement shown in Figures 12 and 13 may be supported on a bayonet probe using a base like 140 shown in Figure 11 with means for attaching the probe in sealed relationship through a vessel wall confining the corrosive atmosphere.

Figure 14:
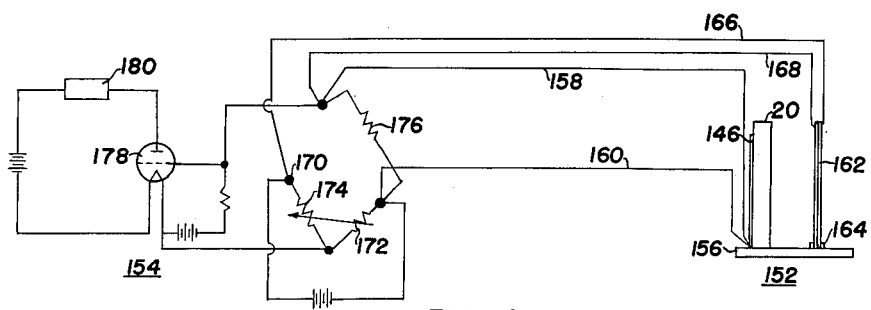
Figure 14 shows the electrical circuit connected to two stain gauges, one of which is attached to the surface of a corrodible element and the other is in contact with the corroding atmosphere for temperature compensation.

Referring to Figure 14, there is shown a corrosion-detecting unit 152 and an associated measuring circuit 154. Unit 152 comprises a suitable base member 156 supporting a test element or sensing element 20 as described in Figures 12 and 13, having attached to its surface a strain gauge with suitable electrical leads 158 and 160. Unit 152 also comprises a second strain gauge 162 which is attached to base 156 by means of socket 164. The fine wire of known resistance which constitutes the strain gauge per se is encased in a suitable envelope of cement, plastic, or felt, so as to insulate same from the associated metal parts and provide mechanical support for the fine wire. Leads 166 and 168 connect strain gauge 162 to the measuring circuit 154.

Circuit 154 comprises Wheatstone bridge arrangement 170 made up of variable resistances 172 and 174, and fixed resistance 176, which latter may be disconnected from the circuit; also included in the bridge-measuring circuit is vacuum tube 178 and oscillograph 180 or other similar metering device. Unit 152 is brought into contact with the corrosive atmosphere. As shown, the circuit is set up so that change in resistance of strain gauge 146, due to the curvature of sensing element 20 caused by its corrosion, and the signal received from strain gauge 162, which is in the same corrosive atmosphere and at the same temperature as element 20, sets up an unbalance in the bridge circuit. This is measured by oscillograph 180 in the manner well known in the art.

Any simple D.C. potentiometer circuit, or D.C. bridge circuit, or the highly sensitive metering and detecting circuits which are known to the art, may be used. Since the time of contact of the unit 152 with the corrosive atmosphere may vary greatly, depending on the severity of corrosion, some adjustment of the sensitivity of the measuring circuit may be necessary as different materials of construction are tested in sensing element 20.

The strain gauges used in accordance with this embodiment of the invention are of conventional design as illustrated by type HFA–2, flat-grid, etched-foil, resistance, surface strain gauges manufactured from 0.005 "thick constantan" which permit their use in high-temperature applications up to 600° F.

Strain gauges of this type are available from the Baldwin-Lima-Hamilton Corporation and are described in greater detail by a periodical published by the company entitled, "Testing Topics," volume 11, 1956. These strain gauges are installed on the test element by cementing the gauges thereto with a type RX–1 high-temperature adhesive supplied by the strain gauge manufacturer. By employing the illustrative detecting and measuring bridge network shown in Figure 14, a D.C. potential of about 12 volts is impressed across the bridge circuit. Suitable amplification of the voltage signal occurring during any unbalancing of the bridge circuit is provided to permit suitable detection of progressive movement of the sensing element 20.

Figure 15:
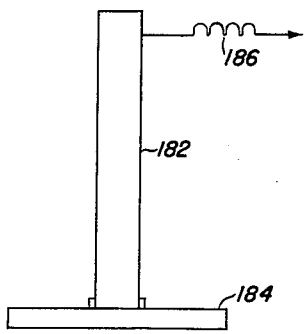
Figure 15 is a simplified side view showing a corrodible element fixed at one end with means to provide stress or strain thereto as a cororsion-test probe.

Referring to Figure 15, the general combination of a corrodible sensing element 182, comprising an exposed or partially exposed coupon of the material of construction under study, means 184 to hold one end thereof in a fixed position and means 186 to impart a mechanical stress or strain at the end thereof or at a point intermediate the end thereof is shown. In this concept, sensing element 182 is composed of the material of construction to be tested. Element 182 may be entirely exposed to corrosion or protected by a coating of plastic on the side opposite the distorting force 186. Means or force 186 may be a mechanical spring, a magnet or a weight. The arrangement shown in Figure 15 may be used in place of elements 20 shown in the other figures to cooperate with the indicating means shown.

In general, the materials of construction used to form the housings, supporting members, lever arms and strain gauges illustrated in this invention, are those which will withstand the corrosive atmosphere and elevated temperatures that may be encountered. In general, the device of this invention is designed to withstand temperatures as high as 1000° F. with pressures running in the order of 800 to 900 p.s.i.g. Accordingly, appropriate gaskets, adhesives, resistance-wire, backings, and other materials of construction are used which will not fail under these conditions, or which are not subjected to deterioration when in contact with the corrosive atmosphere. The strain gauges used in this apparatus may be of any known surface type. Especially well suited for the purposes of this invention are the gauges of the bonded-wire-resistance type commonly designated as SR–4 gauges. Such gauges are E. R. Simmons. The fail-type surface strain gauges may be used in some instances, but such gauges are less sensitive to small changes in strain imparted thereto. The nominal resistance of the gauges can be about 60 to 135 ohms and a variety of wire materials may be used to prepare the resistance elements such as cupronickel, Elinvar nichrome, constantan, etc. Reference may be had to "Electrical Resistance Strain Gauges" by W. B. Dobie et al., English University Press Limited, 1948, and "Testing Topics" by Baldwin-Lima-Hamilton Corporation, vol. 1, October 1944, for additional details regarding the selection of suitable strain gauges, methods of affixing the gauges to testing elements, or mounting the same in a socket such as socket 164 in Figure 14, appropriate instrumentation such as circuit 154 in Figure 14, and other information concerning the application of the strain gauges in the instant invention. Strain gauges of a capacitance or inductance type, or a differential transformer type, also may be used but such strain gauges may have the disadvantage of requiring a more bulky and cumbersome assembly of parts in association therewith.

The difference in the coefficient of linear thermal expansion of the core member 24 and the outer layers 22 and 26 may be varied by choice of materials and the sensitivity desired. It has been found that the combination of steel with a coefficient of $12 \times 10^{-6}$ inches per inch per degree centigrade may be used with admiralty brass with a coefficient of $20 \times 10^{-6}$ inches per inch per degree centigrade. Smaller or larger differences in the coefficient of linear thermal expansion may also be used.

The materials used to form test element 20 may be selected from any of a wide variety of metallic or non-metallic materials of construction as long as the center core-portion 24, has a different coefficient of thermal expansion than the outer layers 22 and 26. The center core-portion need not be all in one piece, but may be divided with the two half-portions, each with an outer layer connected by a bar. Included are combinations selected from any of the metals and alloys used to fabricate parts of process equipment wherein corrosion is a problem. Also, the materials tested may be non-metallic, which is one advantage of the instant device. Among the metallic materials of construction may be mentioned aluminum, brass, cadmium, copper, iron, cast iron, wrought iron, steel, Monel metal, tin, etc. The alloys may include Lynite 122, Stillite No. 1, constantan, Phosphor-bronze, and stainless steels, e.g., Carpenter stainless steels. The non-metallic materials of constuction may include ceramics, paint, plastics and resins which are resistant to chemical attack, such as, alkyl resins in contact with acid solutions such as acetic acid, urea resins in contact with nitric acid solutions of various concentrations, silicone polymers in contact with sodium hydroxide, phenol-furfural condensation products in contact with sulfuric acid, etc.

The corrosive atmospheres that may be tested with the device of this invention vary widely in composition and physical form. The corrosive atmosphere may be liquid, vapor, or dense fluid phase, and be acidic, basic, or essentially neutral in nature. Various combinations of organic and inorganic materials, salts, esters, water vapor systems, etc., may be present as the active corrosive environment. A typical application would be the atmospheres found in chemical and physical processing equipment such as reactors, stills, condensers, heater tubes, valves, pipes, furnaces, etc. Any operation wherein corrosion of metallic or non-metallic materials of construction is encountered may be studied with the device of this invention. Corrosion in catalytic cracking, reforming and alkylation units and associated catalyst regeneration units represents a particular application.

The plastic coating 28 may be selected from the large class of plastics, resins and polymers available on the market. Such materials are described in the article entitled, "Selection and Application of Plastics" by B. Mack, Materials and Methods, September 1948, pp. 91–104. Examples include acrylic resins, alkyl resins, phenolics, cellulose acetate, melamine resins, polyethylene and vinylidene chloride. Selection of a particular coating will depend on the type of metal used for layer 26 and the corrosive atmosphere to be tested. Acrylic resins are desirable since they exhibit high chemical resistance. Other factors such as distortion temperature, thermal expansion, strength and ability to adhere to the metal surface, would be considered by one skilled in the art in selecting a coating.

Having thus described the invention, the only limitations attaching thereto appear in the appended claims and various modifications still within the scope thereof may be realized by one skilled in this art.

What is claimed is:

1. A corrosion-measuring test element comprising a multi-layer elongated probe having an outer exposed layer on one side thereof composed of a corrodible material of construction to be tested, an inner core layer of a dissimilar material of construction having a different coefficient of linear thermal expansion from that of said outer exposed layer, a corrosion protected layer on the other side of said probe composed of said material of construction to be tested, means for preventing corrosion of said protected layer, said outer exposed layer and protected layer having substantially the same thickness and composition, and means for indicating the movement of one end of said probe relative to the other.

2. A corrosion test element consisting of a triple-layer elongated probe including an outer exposed coupon on one side thereof composed of a corrodible material of construction to be tested, an inner coupon of a dissimilar material of construction having a different coefficient of linear thermal expansion from that of said outer coupon, a protected coupon on the other side of said probe composed of the same material as said outer exposed coupon, said outer and protected coupons having substantially the same thickness, said thickness being less than the thickness of said inner coupon, said protected coupon being coated with a flexible, corrosion-resistant substance, and means for indicating the movement of one end of said probe relative to the other.

3. A corrosion-measuring device comprising a multi-layer elongated probe having an outer exposed layer on one side thereof composed of a corrodible material of construction to be tested, an inner core of a dissimilar material of construction having a different coefficient of linear thermal expansion from that of the outer exposed layer, a corrosion protected layer on the other side thereof composed of said material of construction to be tested, said outer exposed layer and protected layer having substantially the same thickness, said thickness being different from that of said inner core, means for preventing corrosion of said protected layer, means at one end of said probe for holding same in a fixed position and means engaging the other end of said probe to measure the deviation from normal of said probe.

4. A corrosion-measuring device comprising a triple-layer elongated probe including an outer exposed coupon on one side thereof composed of a corrodible material of construction to be tested, an inner coupon of a dissimilar material of construction having a different coefficient of linear thermal expansion from that of said outer coupon, a corrosion protected coupon on the other side of said probe composed of the same material of construction as said outer exposed coupon, said outer exposed coupon and protected coupon having substantially the same thickness, means for preventing corrosion of said protected coupon, means at one end of said probe for holding same in a fixed position and means at the other end of said probe to measure the lateral deviation from normal of said probe.

5. A corrosion-measuring device comprising a tubular housing closed at one end and open at the other end, said housing being adapted to be brought into communication with a corrosive atmosphere at its open end, a fixed base support within said tubular housing, a test element mounted on one end to said base support, said test element comprising a bonded layer of three coupons including an outer exposed coupon on one side thereof composed of a corrodible material of construction to be tested, an inner coupon of a dissimilar material of construction having a different coefficient of linear thermal expansion from that of said outer exposed coupon, a corrosion protected coupon on the other side of said test element composed of a material of construction having substantially the same coefficient of linear thermal expansion as said outer exposed coupon, means for preventing corrosion of said protected coupon, means attached to the free end of said test element to indicate the extent of movement of said free end.

6. A corrosion-measuring device in accordance with claim 5 in which said means to indicate said movement comprises a needle pointer attached to the free end of said test element and a divided scale in association therewith.

7. A corrosion-measuring device in accordance with claim 5 in which said means to indicate said movement comprises a rod member attached to the free end of said test element, means to seal said rod member in slideable relationship through the wall of said housing, a pivotallymounted needle attached to the other end of said rod member and a divided scale in association with said needle.

8. A corrosion-measuring device in accordance with claim 7 in which the other end of said rod is attached to a valve within a conduit carrying a fluid under pressure, and pressure-sensitive means are located in said conduit on each side of said valve.

9. A corrosion-measuring device in accordance with claim 5 in which said means to indicate said movement comprises a mercury switch mechanically connected to said free end of said test element and an electrical indicating means connected through a source of power to said mercury switch.

10. A corrosion-measuring device in accordance with claim 5 in which said last-named means includes a strain gauge attached to the outer surface of said protected coupon, and electrical means connected to said strain gauge to indicate the distortion thereof.

11. A corrosion-measuring device in accordance with claim 5 in which a plurality of said test elements are provided within said housing, said test elements being attached in series one to the other at opposite ends with the exposed coupon thereof on the same side in the series, the first of said test elements being attached to said base support and the last of said test elements attached to said indicating means.

References Cited in the file of this patent

UNITED STATES PATENTS

| | | |
|---|---|---|
| 1,649,907 | Mayer | Nov. 22, 1927 |
| 2,470,753 | Alban | May 24, 1949 |
| 2,683,789 | Ray | July 13, 1954 |
| 2,827,724 | Edds | Mar. 25, 1958 |
| 2,515,337 | Clark | July 18, 1959 |

UNITED STATES PATENT OFFICE
CERTIFICATION OF CORRECTION

Patent No. 2,976,123                          March 21, 1961

Glenn A. Marsh et al.

It is hereby certified that error appears in the above numbered patent requiring correction and that the said Letters Patent should read as corrected below.

Column 2, line 52, for "stain" read -- strain --; column 6, line 45, after "are" insert -- described in detail in U. S. Patent 2,292,549 by --.

Signed and sealed this 5th day of September 1961.

(SEAL)
Attest:

ERNEST W. SWIDER
Attesting Officer

DAVID L. LADD
Commissioner of Patents